J. L. AND R. BAUER.
FOOD GRINDING DEVICE.
APPLICATION FILED MAY 5, 1919.

1,324,490.

Patented Dec. 9, 1919.

Inventors:
Jacob L. Bauer
Robert Bauer

UNITED STATES PATENT OFFICE.

JACOB L. BAUER AND ROBERT BAUER, OF MILWAUKEE, WISCONSIN.

FOOD-GRINDING DEVICE.

1,324,490.  Specification of Letters Patent.  Patented Dec. 9, 1919.

Application filed May 5, 1919. Serial No. 294,909.

*To all whom it may concern:*

Be it known that we, JACOB L. BAUER and ROBERT BAUER, both citizens of the United States, and residents of Milwaukee, in the county of Milwaukee and State of Wisconsin, have invented certain new and useful Improvements in Food-Grinding Devices and we do hereby declare that the following is a full, clear, and exact description thereof.

Our invention relates to new and useful improvements in devices for comminuting food material, more particularly of that type disclosed in our copending application for patent filed March 25th, 1919, Serial No. 284,945, adapted for household use and comprising a main cylinder with which is associated a reciprocative cutter member movable across one end of the cylinder.

It is the object of our present invention to provide an arrangement in connection with said main cylinder for carrying out the operation of grinding meat or other relatively tough food material wherein the food material is forcibly mechanically fed toward the cutting means.

It is more particularly our object to provide a selfcontained grinder unit which may be readily associated with or detached from the cylinder and which utilizes the cylinder as a support means.

A further object resides in a provision of a unit of this character which is of exceedingly simple construction and which may be readily assembled and disassembled for the frequent cleaning operations necessary in the use of devices of this character.

With the above and other objects and advantages in view, our invention resides in the novel combination, formation and arrangement of parts hereinafter more fully described and particularly pointed out in the appended claims.

Figure 1:
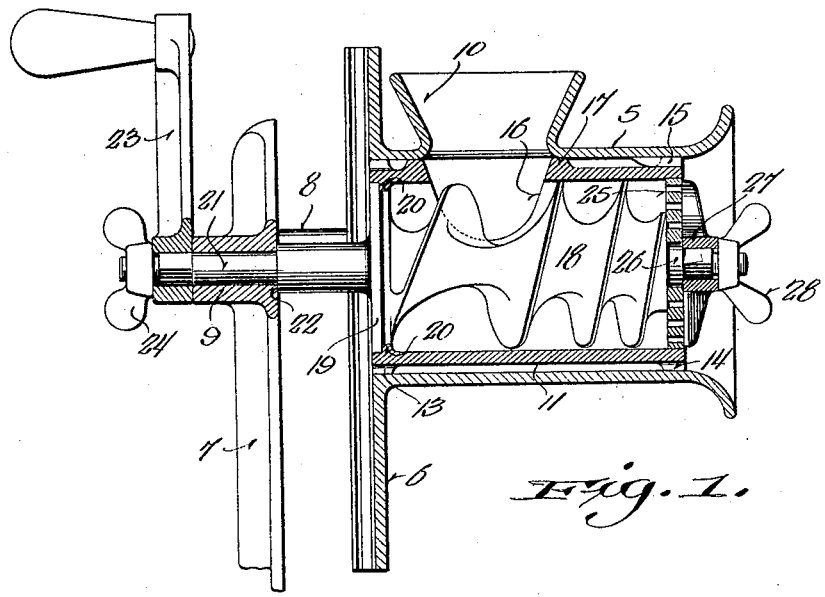
Figure 1 is a vertical sectional view through a food grinding device embodying our invention.
Figure 2:
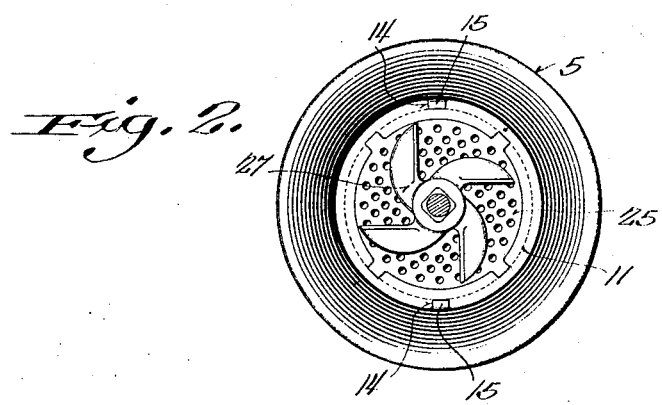
Fig. 2 is an elevational view of the discharge end portion.

Referring now more particularly to the accompanying drawings, number 5 designates the horizontally extending feed cylinder of the food comminuting device shown in our said co-pending application, this cylinder having a track wall 6 at one end and being supported at said end in spaced relation to a standard 7 by studs 8 projecting from the standard at the sides of the cylinder, the standard affording a fixed support for the device and the cylinder track wall 6 being adapted to mount a reciprocative cutter member driven from a crank shaft which is journaled in a bearing 9 on the standard, said shaft and cutter member being removed in the use of the grinder unit comprising the subject matter of the present application. The feed cylinder 5 is provided with an intermediate supply hopper 10 and has its free end portion flared, both ends of the cylinder being open.

The grinder unit comprises an inner cylinder 11 which is slightly smaller in external diameter than the internal diameter of the cylinder 5 and which is adapted to be slid into the cylinder 5, one end of the cylinder 11 being provided with a series of outstanding lugs 13 which are machined to form an accurate fit against the periphery of the cylinder 5 at its inner end. The other end of the cylinder 11 is provided with an outstanding annular flange fitting in the outer end of the cylinder 5 and provided with recesses 14 for registry with the holding lugs 15 on the cylinder 5 which, as more particularly set forth in our said copending application, are adapted to hold a follower member against accidental movement from the cylinder 5, this follower member being removed in the use of the present grinder unit. The inner cylinder 11 is provided with an inlet opening 16 in registry with the discharge mouth of the supply hopper 10, and the outer periphery of the cylinder 11 is provided with an outstanding rib 17 surrounding the opening 16 to close the space between the cylinders. A feed worm 18, of the type common to meat grinders, is rotatably disposed in the cylinder 11, this worm having an annular flange 19 on one end in peripheral bearing engagement with the inner end of the cylinder 11 and in end-thrust bearing engagement with an inwardly extending annular flange 20 formed in said cylinder adjacent its inner end. A shaft section 21 extends from the worm and is journaled in the bearing 9 of the standard, said shaft having a shoulder 22 adapted to abut the standard. A crank handle 23 is secured on the outer squared end of the shaft section by a wing nut 24. A perforated plate 25 is disposed in the outer end portion of the cylinder 11 and this plate is centrally apertured to form a journal for a shaft section 26 extending from the outer end of the feed worm 18, a knife member 27 being secured on said shaft portion at the outer face of the plate and retained in place by a wing nut 28 threaded on the extremity of the shaft section.

A simple and complete arrangement is thus provided wherein all the parts are held in assembled operative position. The cylinder 11 is held against rotation by the lugs 15 and is held by the plate 25 and flange 19 of the worm against longitudinal movement in either direction, said worm being in turn held against longitudinal movement by the abutment of the shaft shoulder 22 and hub of the crank 23 against the standard bearing 9. The grinding operation is carried out in the usual manner by rotating the worm 18 to force the food material through the apertured plate 25 from which the material is removed by the shear action of the radial blades of the knife member 27. The entire grinder unit may be removed by simply removing the wing nut 24 and all the parts of the grinder unit may be mutually disassembled by removing the wing nut 28.

By the arrangement described, the cylinder and support standard of the device shown in our copending application are utilized to operatively mount a grinder unit.

While we have shown and described a preferred embodiment of our invention, it will be appreciated that various changes and modifications of structure may be employed to meet differing conditions of use and manufacture without department in any manner from the spirit of our invention.

What is claimed is:

1. A device of the class described comprising a feed cylinder having a peripheral shoulder adjacent one end, means for supporting said cylinder, an apertured plate in detachable interlocking connection with the other end portion of the cylinder, said plate being provided with a bearing opening, a feed worm disposed in the cylinder, a bearing flange on one end of the feed worm in end thrust engagement with said shoulder of the cylinder, a shaft extension on the other end of the feed worm journaled in the bearing of the apertured plate, a cutter on said shaft extension, and means for rotating the feed worm.

2. A device of the class described comprising a support, a feed cylinder in interlocking engagement with said support and detachable therefrom upon axial movement in one direction, feeding and cutting means carried by said cylinder and including a shouldered shaft section extending therefrom, means preventing relative longitudinal movement of said cylinder and said feeding and cutting means, a bearing carried by the support in axial alinement with the cylinder and in spaced relation to one end of the cylinder, said bearing receiving the shaft section and being in end thrust engagement with the shoulder of said shaft section, and a crank handle detachably secured on the shaft section and holding said shaft section against relative axial movement.

3. A device of the class described comprising the combination with a cylinder, a shaft bearing spaced from one end of the cylinder and in co-axial alinement therewith, of a second cylinder adapted to be mounted within the first cylinder, means for preventing relative rotation of the cylinders, and a feeding and cutting means carried by the second cylinder and including a shaft journaled in said bearing.

4. A device of the class described comprising the combination with a cylinder, a shaft bearing spaced from one end of the cylinder and in co-axial alinement therewith, of a second cylinder adapted to be mounted within the first cylinder, means for preventing relative rotation of the cylinders, a feeding and cutting means carried by the second cylinder and including a shaft journaled in said bearing, means for preventing relative axial movement of the second cylinder and said feeding and cutting means whereby to form a single detachment unit, and means associated with said shaft and bearing for detachably preventing relative axial movement of the shaft.

5. A device of the class described comprising a combination with a cylinder having an inlet intermediate of its ends, of a second cylinder adapted to be mounted within the first cylinder and provided with an inlet for registry with the inlet of the first cylinder, lugs on one end portion of the second cylinder adapted to engage the inner periphery of a portion of the first cylinder, said other end portions of the cylinders being provided with interlocking lug and recess portions adapted to prevent relative rotation of the cylinders, a feeding and cutting means carried by the second cylinder, means for rotating said feeding and cutting means, and means for preventing axial movement of the second cylinder relative to the first cylinder.

6. A device of the class described comprising a combination with a cylinder having an inlet intermediate of its ends, of a second cylinder adapted to be mounted within the first cylinder and provided with an inlet for registry with the inlet of the first cylinder, the external diameter of the second cylinder being less than the internal diameter of the first cylinder, outstanding lugs on the second cylinder engageable with one end portion of the periphery of the first cylinder, a lug on the other end portion of the first cylinder, a flange on the adjacent end portion of the second cylinder recessed to receive the lug of the first cylinder, a rib on the periphery of the second cylinder surrounding the inlet of said second cylinder, feeding and cutting means carried by the second cylinder, and means for rotating said feeding and cutting means.

In testimony that we claim the foregoing we have hereunto set our hands at Milwaukee, in the county of Milwaukee and State of Wisconsin.

JACOB L. BAUER.
ROBERT BAUER